United States Patent
Huang et al.

(10) Patent No.: US 7,783,580 B2
(45) Date of Patent: Aug. 24, 2010

(54) CONTROL METHOD COMBINING FUZZY LOGIC CONTROL WITH SLIDING MODE CONTROL FOR IDEAL DYNAMIC RESPONSES

(75) Inventors: Shiuh-Jer Huang, Taipei (TW); Shu-Yi Lin, Taipei County (TW); Guang-Ling He, Taichung County (TW)

(73) Assignee: National Taiwan University of Science and Technology, Taipei (TW)

( * ) Notice: Subject to any disclaimer, the term of this patent is extended or adjusted under 35 U.S.C. 154(b) by 646 days.

(21) Appl. No.: 11/832,137

(22) Filed: Aug. 1, 2007

(65) Prior Publication Data

US 2008/0222056 A1 Sep. 11, 2008

(30) Foreign Application Priority Data

Mar. 5, 2007 (TW) .............................. 96107476 A

(51) Int. Cl.
*G06F 15/18* (2006.01)
*G05B 13/02* (2006.01)
(52) U.S. Cl. ............................................ 706/1; 700/50
(58) Field of Classification Search ................ 706/1, 706/3–4, 52, 900; 700/50; 708/801
See application file for complete search history.

(56) References Cited

U.S. PATENT DOCUMENTS 5,988,848 A  11/1999  Berstecher et al.
2006/0072391 A1*  4/2006  Zhou ........................ 369/44.32

FOREIGN PATENT DOCUMENTS

TW      300290      3/1997

OTHER PUBLICATIONS

Huang, S-J. et al. "Adaptive sliding controller with self-tuning fuzzy compensation for vehicle suspension control", Mechatronics. vol. 16, pp. 607-622. 2006.*
Pai, N-S. "Design of Fuzzy Logic Based Estimators and Their Applications", PhD Dissertation. National Cheng Kung University, Tainan, Taiwan. Dec. 2002.*
Erbatur, K. et al. "Fuzzy adaptive sliding mode control of a direct drive robot", Robotics and Autonomous Systems, vol. 19, pp. 215-227. 1996.*
Kaynak, O. et al. "The Fusion of Computationally Intelligent Methodologies and Sliding-Mode Control-A Survey", IEEE Trans. on industrial electronics, vol. 48, No. 1, pp. 4-17. Feb. 2001.*

(Continued)

*Primary Examiner*—Donald Sparks
*Assistant Examiner*—Benjamin Buss
(74) *Attorney, Agent, or Firm*—J.C. Patents

(57) ABSTRACT

The invention provides a novel control method combining fuzzy logic control with gain auto-tuning sliding mode control. A control error signal e(t) from the detection mechanism and an error change signal ce(t) are combined together as a sliding variable $s(t)=ce(t)+\lambda e(t)$ and used as the fuzzy input control variable. Using the control method, 2D fuzzy control rule is simplified into 1D fuzzy control rule through the sliding variable definition for enhancing the efficiency of computation and saving computation resources. Accordingly, both the quick transient response and steady state precision positioning can be achieved. The present method can overcome the disadvantages of current controller, which can not reach the desired transient and steady state responses simultaneously.

4 Claims, 5 Drawing Sheets

OTHER PUBLICATIONS

Wang, W-J. et al. "Fuzzy Control Design for the Trajectory tracking in Phase Plane", IEEE Trans. On Systems, Man, and Cybernetics—Part A; Systems and Humans, vol. 28, No. 5, pp. 710-719. Sep. 1998.*

Chen, C.L. et al. "Modeling and high-precision control of a ball-screw-driven design", Precision Engineering. vol. 28, pp. 483-495. 2004.*

* cited by examiner

US 7,783,580 B2

CONTROL METHOD COMBINING FUZZY LOGIC CONTROL WITH SLIDING MODE CONTROL FOR IDEAL DYNAMIC RESPONSES

CROSS-REFERENCE TO RELATED APPLICATION

This application claims the priority benefit of Taiwan application serial no. 96107476, filed on Mar. 5, 2007. All disclosure of the Taiwan application is incorporated herein by reference.

BACKGROUND OF THE INVENTION

1. Field of the Invention

The present invention generally relates to a fuzzy logic control apparatus and method, and more particularly, to an improved control method combining fuzzy logic control with sliding mode control, and also to application of the control method to a positioning mechanism which is a 2D servo positioning control device including a servo motor drive mechanism, a two-axis servo stage, a microcomputer control system, an interface convert control circuit, and an optical position detection mechanism. The positioning control method can not only be used with positioning control of 2D movement, but also be used in other fields such as positioning control of rotation or 3D movement.

2. Description of Related Art

With progress in semiconductor industry in recent years, various products tend to be light, thin and small, which imposes an increasingly higher precision requirement on fabrication thereof. Among others, precision positioning systems have been indispensable in semiconductor industry, optical communication industry, biomedical industry, MEMS, and the like. Traditionally used positioning systems include friction Piezo-actuated positioning stages, magnetic levitation positioning stages, friction drive positioning stages, lead screws positioning stages, and the like, each having its advantages and disadvantages. Usually, the lead screw positioning stage is widely welcomed in the industry because of its low price. However, the lead screw positioning stage can only reach micro-positioning and are unable to provide nano-positioning capability due to some of its mechanical characteristics, such as backlash problem. Therefore, conventional positioning stages with nano-positioning capability are all of Piezo-actuation, magnetic levitation or hydrostatics, which are expensive and have a short travel.

Currently, a most common method of traditional positioning system is to use a PID controller, which is advantageous in uncomplicated computation, but unable to meet high precision positioning control requirements. To address this problem, several intelligent control methods have been proposed for the positioning. One example of the methods is the use of a fuzzy logic controller, which uses a fuzzy logic rule [IF-THEN] to compute. However, this method requires a substantial computation resource and a long computation time, which makes the control device prohibitively expensive. Therefore, Taiwan Patent Number 300,290 proposed a defuzzification theory and design, providing a defuzzification method that does not need much data storage space and allows for relatively simpler computation. However, this Taiwan patent covers only improvements in the defuzzification part, and thus cannot achieve a higher speed of the overall computation.

U.S. Pat. No. 5,988,848 disclosed a novel control method which uses a hardware control circuit as a control parameter controller for a fuzzy sliding controller. Outputs of the fuzzy sliding controller and a plant are used as inputs of an adaptive controller, and an output of the adaptive controller is then used as parameters of the fuzzy sliding controller. As such, the output architecture of the fuzzy controller is variable. However, this controller needs to perform many complicated computation steps and, when used in practice, still consumes a lot of computation resources and time. As such, applying this fuzzy controller to precise positioning can be still difficult.

Having acknowledgement of the indispensability of the precision positioning stages and deficiency of various control methods, shortcomings need to be solved can be summarized as follows: (1) to reach high precision positioning, expensive positioning stages are required, making the positioning not cost-effective in practice; (2) if complicated control methods are used, then the computation time is increased and the hardware device is large in size, which is unpractical in use; and (3) the traditional control methods cannot achieve both quick transient response and steady state precise positioning. For these reasons, it is desired to improve the precision positioning stages and control method thereof.

SUMMARY OF THE INVENTION

In response to the need of positioning in the industry and consideration of working stage cost, the present invention provides an improved control method combining fuzzy logic control with sliding mode control, which is utilized in a low cost 2D servo positioning stage to meet the industry requirements of low-price but high precision. The improved control method provides effective control power and provides the 2D servo positioning stage with quick transient response capability without producing overshoot.

In a first aspect, the present invention provides a control method combining fuzzy logic control with sliding mode control, which is adapted for receiving an input signal and obtaining an output signal corresponding to the input signal through sliding mode parameter definition and fuzzy logic inference, wherein the input signal is denoted as e(t) representing for an error between a practically measured stage displacement and a desired displacement, a signal ce(t) representing for an error change amount is obtained from the input signal e(t), sliding variables are defined as $s(t)=ce(t)+\lambda e(t)$ and are used as input control variables of fuzzy control prior to fuzzification, the output signal is servo mechanism drive power u(t) for driving the servo mechanism to move the stage, and wherein the value of $\lambda$ is designed according to convergence rates of the two variables e(t) and ce(t). Using the control method, 2D fuzzy control rule is simplified into 1D fuzzy control rule through the sliding variable defined by the sliding mode, thus enhancing the computing efficiency and reducing computing resource.

In a second aspect, the present invention provides an improvement on the control method according to the first aspect, the improvement being that the membership function gain is made variable. In conventional fuzzy logic control methods, the sliding variable usually needs to be multiplied by a corresponding gain gs(t) so that the sliding variable is projected into a close interval to be fuzzified; and after defuzzification, an output variable needs also to be multiplied by a corresponding gain to correct its control output amount. Regarding this issue, the present invention selects different membership function gains according to the value of the control variables, the sliding variable s(t) defined by the sliding mode is corrected by corresponding function gain gs(t), and the drive power u(t) inferred by the fuzzy logic is corrected by corresponding function gain gu(t). At the beginning where the sliding variable is relatively large, the membership function gains gs(t) and gu(t) are in exponential decay to rapidly narrow the membership function scope; as the sliding variable approaches a target value, the function gains gs(t) and gu(t) fall down to a minimum according to a linear function, narrowing the membership function scope so that the system error is within a desired range.

Using the above variable membership function gain tuning method, the present invention makes improvement on the convention methods in which the gain is fixed, and quickly narrows the membership function scope by combining the input variable with the exponential function and the linear function. In addition, control with quick transient response and good steady state error range can be achieved. Moreover, the output of the control power has no excessive jitters, which greatly reduces the wastage of power.

In a third aspect, the present invention provides a control method for a positioning stage. The control method includes the control rules according to the first and second aspects, and practices the control rules in a low-price 2D servo positioning stage. A position signal detected by an optical position detection system is compared with a desired position signal to obtain an error therebetween, and the error is used as an input signal e(t) of fuzzy control. A computed control output signal u(t) is used as drive power for driving the servo mechanism. The positioning control of the present invention can be used not only in 2D plane linear control, but also in 1D, 3D movement control or rotation control.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
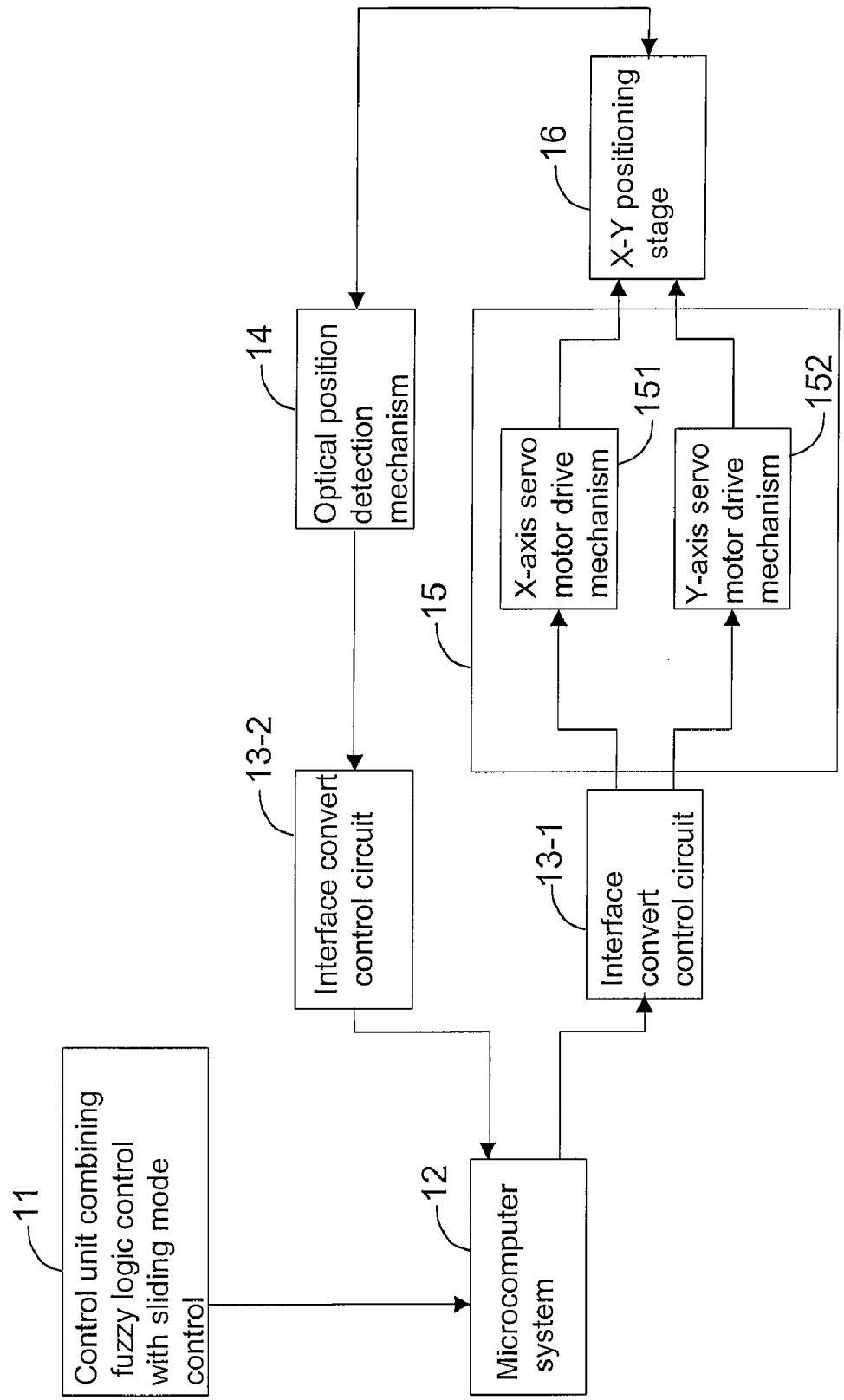
FIG. 1 illustrates a block diagram of a control apparatus according to an embodiment of the present invention.

The present invention provides a control apparatus combining fuzzy logic control with sliding mode control and control method thereof. Referring to FIG. 1, which illustrates a block diagram of the control apparatus according to an embodiment of the present invention, the control apparatus 10 mainly includes a control unit combining fuzzy logic control with sliding mode control 11, a microcomputer system 12, an interface convert control circuit (e.g., AD/DA converter) 13-1, 13-2, an optical position detection mechanism 14, a servo motor drive mechanism 15, and a two-axis X-Y positioning stage 16 in which the present invention is applied.

Software of the control unit 11 is programmed according to the improved control method of the present invention and loaded into the microcomputer system 12. The microcomputer system 12 is coupled to the servo motor drive mechanism 15 via the interface convert control circuit (e.g., DA converter) 13-1, thereby driving the X-Y positioning stage 16 to move to desired positioning points. During moving of the positioning stage 16, the optical position detection mechanism 14 detects a position signal and transfers the position signal back to the interface convert control circuit (e.g., AD converter) 13-2 for conversion. The resulted signal from the conversion is transmitted into the microcomputer system 12 and computed by its internal control unit 11 to complete one cycle of close loop control and then quickly and precisely achieve transient positioning and quick response.

Figure 2:
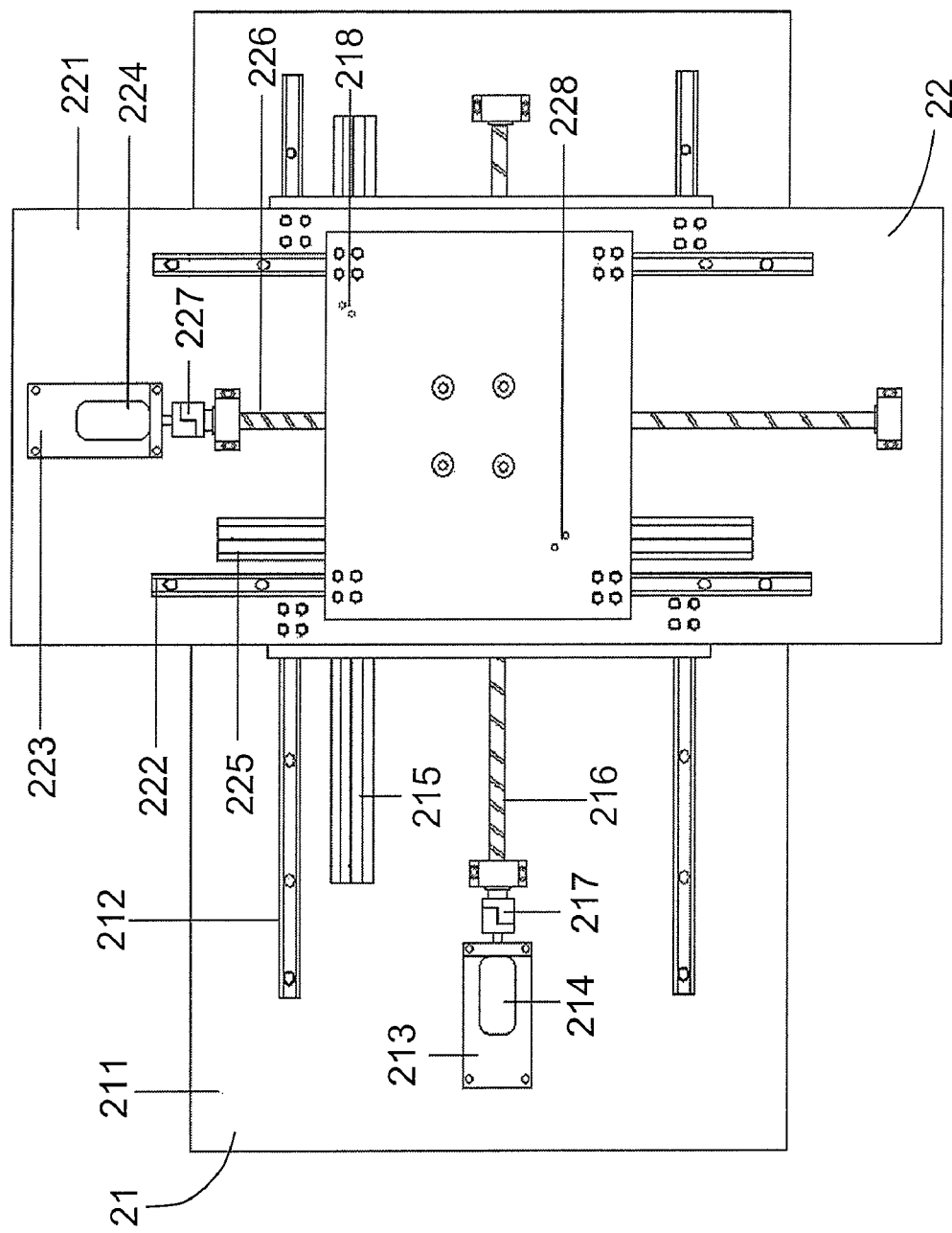
FIG. 2 is a schematic view of a 2D servo positioning stage according to an embodiment of the present invention.

In addition, referring to FIG. 2, which is a schematic view of a low-price 2D servo drive positioning stage used by the present invention, the servo drive positioning stage includes two main parts, i.e., an X-axis positioning stage 21 and a Y-axis positioning stage 22. An X-axis base 211 and a Y-axis base 221 are attached to proper positions of the X-axis positioning stage 21 and the Y-axis positioning stage 22, respectively. An X-axis linear guide 212 and a Y-axis linear guide 222 are included to guide movements along X and Y directions, respectively. An X-axis motor base 213 and a Y-axis motor base 223 are configured for positioning of servo drive motors 214, 224, respectively. By using shaft couplings 217 and 227, ball lead screws 216 and 226 are driven to rotate to achieve the positioning. The servo drive motors 214 and 224 correspond to an X-axis servo motor drive mechanism 151 and a Y-axis servo motor drive mechanism 152, respectively. Optical scales 215 and 225 detect X-axis and Y-axis displacement signals by using sensors 218 and 228, respectively. The sensors 218 and 228 then transfer the detected displacement signals to the interface convert control circuit 13-2 in FIG. 1 to obtain displacement information for controlling the X-Y positioning stage.

Figure 3:
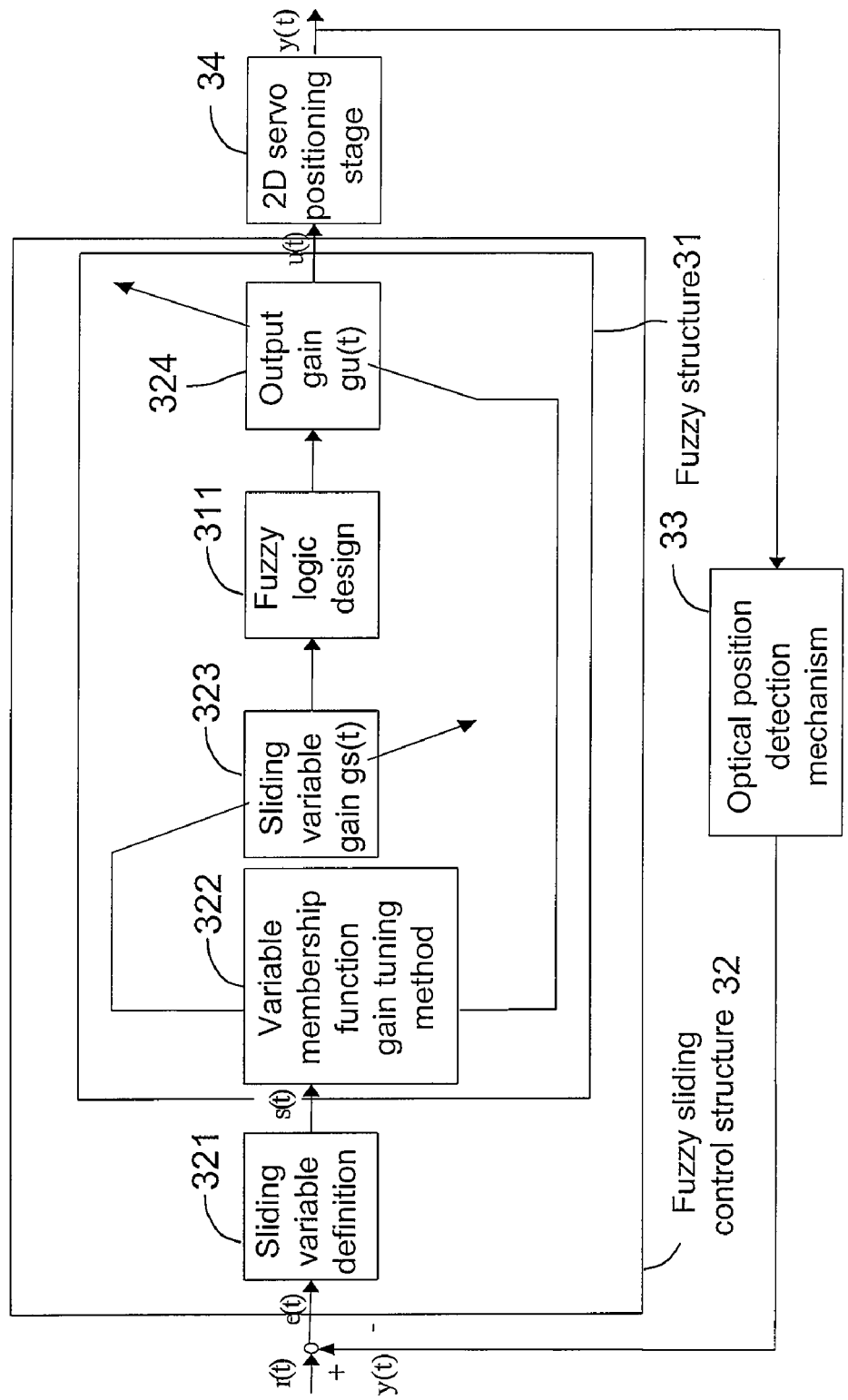
FIG. 3 schematically shows controlling of the improved combined fuzzy logic and sliding mode.

In this embodiment, the control unit combining fuzzy logic control with sliding mode control 11 is a feature of the present invention. FIG. 3 schematically shows control procedures of the control unit 11. The control unit 11 includes a fuzzy sliding control structure 32 mainly using a positioning error e(t) as its input signal. The positioning error e(t) results from a deviation between a desired displacement signal r(t) and a practical displacement signal y(t) detected by the optical position detection mechanism 33. The fuzzy sliding control structure 32 further includes a control output signal u(t), for driving a 2D servo positioning stage. In addition, the fuzzy sliding control structure 32 includes a definition of sliding variable $s(t)=ce(t)+\lambda e(t)$ 321, mainly for defining the error signal e(t) which is input into the fuzzy sliding control structure 32, and an error change signal ce(t), so that the sliding variable s(t) can reach a steady state interval. The value of $\lambda$ is designed according to the convergence rate of the variables e(t) and ce(t), such as, for example, being within the scope 0 to 500.

The sliding variable is used as a control input signal of a fuzzy structure 31. The fuzzy structure 31 mainly implements a variable membership function gain tuning method 332, which is another feature of the present invention. The variable membership function gain tuning method 332 is an improved method with respect to a general control architecture that input variable needs to be multiplied by a corresponding gain so that the input variable is projected into a close interval to be fuzzified and, after defuzzification, an output variable needs also to be multiplied by a corresponding gain to correct its control output amount. The variable membership function gain tuning method 332 associates the input sliding variable s(t) with an exponential function or a linear function according to the value of the input sliding variable s(t) to appropriate tune the gain (Details will be described with reference to FIGS. 4 and 5). Sliding variable gain gs(t) 323 and output gain gu(t) 324 are resulted from the variable membership function gain tuning method 332, and fuzzy logic design 311 is mainly in the form of [IF-THEN] constructions. In the present invention, conventional double input variable is simplified into single input variable through the sliding variable definition; 2D fuzzy rule of the fuzzy logic design 311 is therefore simplified into 1D fuzzy rule, thereby greatly simplifying the computation.

Figure 4:
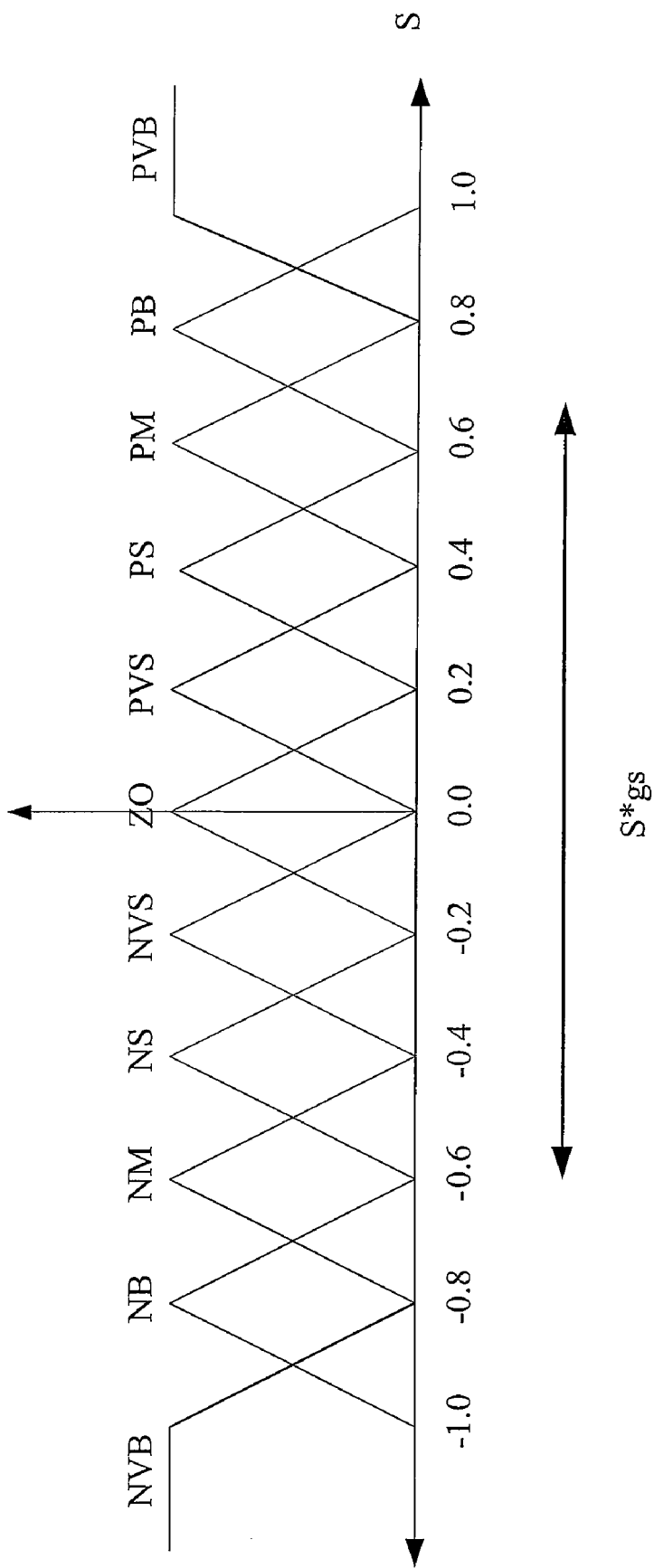
FIG. 4 illustrates a membership function of the sliding variable as shown in FIG. 3.

The detailed concept of the variable membership function gain tuning method 332 according to the present invention is described as follows. FIG. 4 illustrates a membership function of the sliding variable. The input sliding variable s(t) is fuzzified according to the eleven control rules. It should be understood that, the number of the control rules is not limited to eleven and could be more or less than eleven, and more control rules mean longer computation time. However, it is suggested that the number of the control rules be at least more than five. The value of the sliding variable s(t) is variable; to make the best of the fuzzy rules, the sliding variable s(t) is usually multiplied by a corresponding gain gs(t) so that the sliding variable is projected into the entire close interval. The sliding variable s(t) varies within a large range; therefore, controlling with quick response and without overshoot and steady state error cannot be achieved if a same gain gs(s) is used with all sliding variables. Accordingly, to address the variation of the gain gs(t), the variable gain tuning method is proposed by the present invention. Taking advantage of the combination of the exponential function and the linear function, this variable gain tuning method tunes the gain for the sliding variable. With this method, not only the variation of the input sliding variable can be considered, but also the corresponding gain can be produced according to such variation. With respect to output signal control, the same method is used to tune the corresponding gain gu(t) so that the entire system can have characteristics of quick transient response and low steady state error. In addition, since the method of combining the exponential function with the linear function is also applied to the output signal, waste in unnecessary control power can be effectively reduced.

Figure 5:
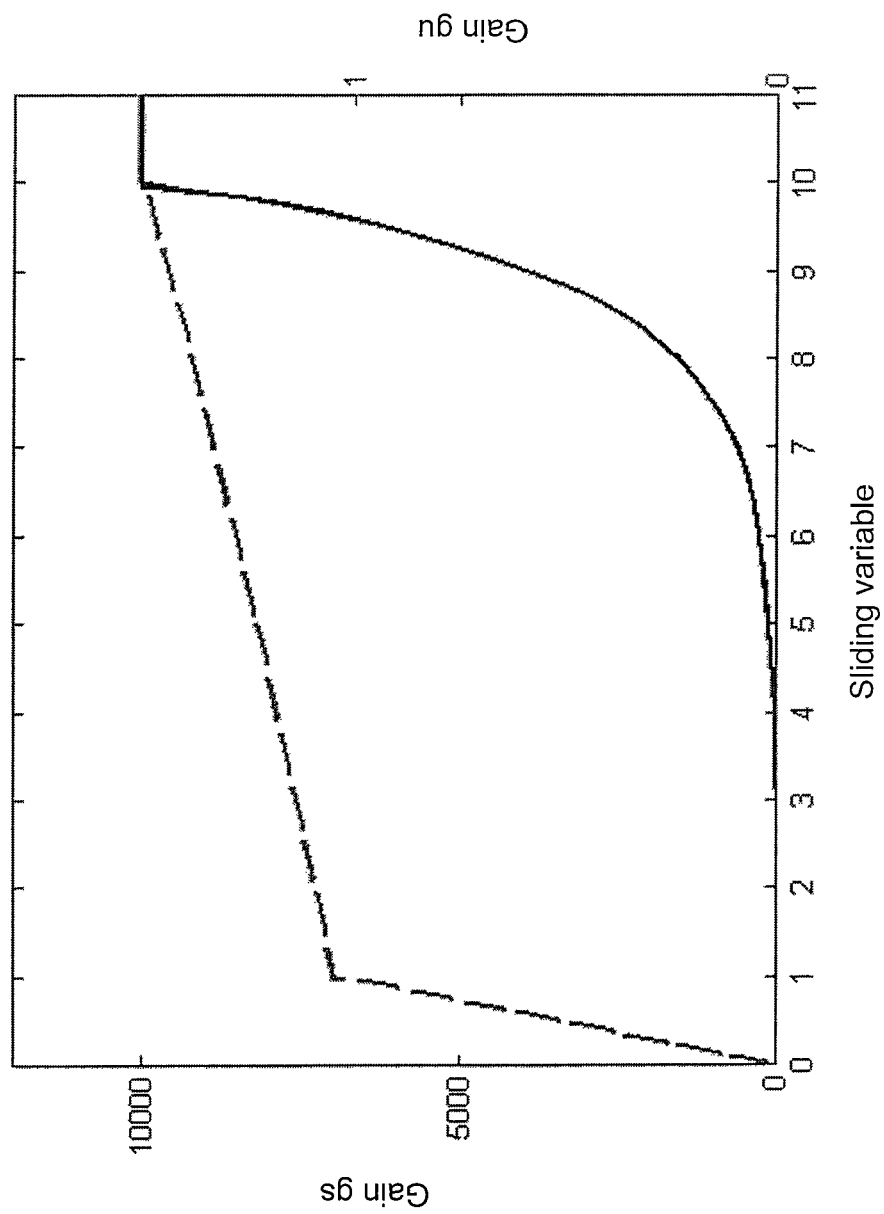
FIG. 5 is a diagram showing the gain of the variable membership function gain tuning method as shown in FIG. 3.

FIG. 5 is a diagram showing the variable gain corresponding to the sliding variables, together with an exponential function characteristic curve (shown as solid line) and a linear function characteristic curve (shown as broken line). At the beginning where the sliding variable is relatively large, the function gains gs(t) and gu(t) are in exponential decay to rapidly narrow the membership function scope; as the sliding variable approaches a target value, the function gains gs(t) and gu(t) fall down to a minimum according to the linear function.

To prove practicality and utilizability of the concept of the present invention, the practical application (shown in FIG. 2) is conducted according to industry application, including long time back-and-forth process and control and long time back-and-forth control by using square-wave response. It is evidenced by the result of the practical application that the concept of the present invention can be practiced in low-cost stages to achieve long travel (over 500 mm) precision nano-positioning, and ensure the quick response and high precision for positioning.

Besides, the concept of the present invention can be practiced in quantitative control in other fields such as, for example, temperature, speed and pressure. In these control, the input signal e(t) represents for an error between a practically measured value and a desired value. A signal ce(t) representing for an error change amount is obtained from the input signal e(t). Sliding variables are defined as s(t)=ce(t)+$\lambda$e(t) and are used as input control variables for fuzzy control prior to fuzzification. The output signal is control power u(t), for controlling output values of the temperature, speed or pressure.

In summary, through the above disclosure and practical application, it is known the present invention has the following advantages: (1) the present invention proposes an improved control method combining fuzzy logic control with sliding mode control, wherein the variable membership function gain tuning method takes advantage of a fuzzy structure combining the exponential function with the linear function, and can achieve quick transient response without producing overshoot and with low steady state error, and effectively control the gain to reduce waste in control power; (2) the control method combining fuzzy logic control with sliding mode control simplifies the original 2D fuzzy control rule into 1D fuzzy control rule through the sliding variable definition, which greatly reduces the computation time; and (3) the proposed inventive concept can be effectively utilized with low-cost positioning stages such as ball lead screw positioning stages to meet the precision nano-positioning requirement, and thus reduce the cost of industry application.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control method combining fuzzy logic control with sliding mode control, comprising:

receiving an input signal and obtaining an output signal corresponding to the input signal through sliding mode parameter definition and fuzzy logic inference, wherein the input signal is denoted as e(t) representing an error between a practically measured stage displacement and a desired displacement, a signal ce(t) representing an error change amount is obtained from the input signal e(t), sliding variables are defined as s(t)=ce(t)+$\lambda$e(t) and are used as input control variables for fuzzy control prior to fuzzification, the output signal is servo mechanism drive power u(t) driving the servo mechanism to move the stage, and wherein the value of $\lambda$ is designed according to convergence rate of the two variables e(t) and ce(t);

selecting different membership function gains according to a value of the control variables, wherein the sliding variable s(t) defined by the sliding mode is corrected by corresponding function gain gs(t), and the drive power u(t) inferred by the fuzzy logic is corrected by corresponding function gain gu(t); and wherein initially the sliding variable s(t) is relatively large, the function gains gs(t) and gu(t) are in exponential decay to rapidly narrow a scope of the membership function gains, and as the sliding variable s(t) approaches a target value, the function gains gs(t) and gu(t) fall to a minimum according to a linear function.

2. The control method in accordance with claim 1, wherein a 2D fuzzy control rule is simplified into a 1D fuzzy control rule through the sliding variables defined by the sliding mode.

3. The control method in accordance with claim 1, wherein the control method is adapted for use in 1D linear control, 2D plane linear control and 3D movement or rotation control.

4. The control method in accordance with claim 1, wherein the control method is adapted for use with lead screw positioning stages to meet low cost and long travel precision nano-positioning requirements.

* * * * *